United States Patent [19]
Shintani

[11] Patent Number: 5,751,371
[45] Date of Patent: May 12, 1998

[54] PICTURE RECEIVING APPARATUS

[75] Inventor: Peter Shintani, Tokyo, Japan

[73] Assignee: Sony Corporation, Tokyo, Japan

[21] Appl. No.: 570,515

[22] Filed: Dec. 11, 1995

[30] Foreign Application Priority Data

Dec. 22, 1994 [JP] Japan .................. 6-319585

[51] Int. Cl.$^6$ .................. H04N 5/445; H04N 5/262
[52] U.S. Cl. .................. 348/564; 348/468; 348/565; 348/553
[58] Field of Search .................. 348/468, 465, 348/553, 564, 565, 563, 568, 585, 589, 600

[56] References Cited

U.S. PATENT DOCUMENTS

| | | | |
|---|---|---|---|
| 4,777,537 | 10/1988 | Hakamada et al. | 348/565 |
| 5,109,275 | 4/1992 | Ando | 348/564 |
| 5,138,450 | 8/1992 | Fukuda et al. | 348/564 |
| 5,161,019 | 11/1992 | Emanuel | 348/565 |
| 5,296,918 | 3/1994 | Kim | 348/568 |
| 5,402,183 | 3/1995 | Janaka | 348/565 |
| 5,473,431 | 12/1995 | Jomiyasu | 348/564 |
| 5,610,664 | 3/1997 | Robert | 348/565 |

*Primary Examiner*—Victor R. Kostak
*Attorney, Agent, or Firm*—Jay H. Maioli

[57] ABSTRACT

A picture receiving apparatus wherein a received video signal is converted into digital video data which is further compressed before being recorded on a minidisk set in a disk mounting unit along with caption information superimposed on the video signal and index information is recorded. A remote commander is used to select a desired item from index information displayed on a display screen. Pictures of the selected item are displayed on a child screen and caption information associated with the pictures is displayed in a caption display area.

16 Claims, 9 Drawing Sheets

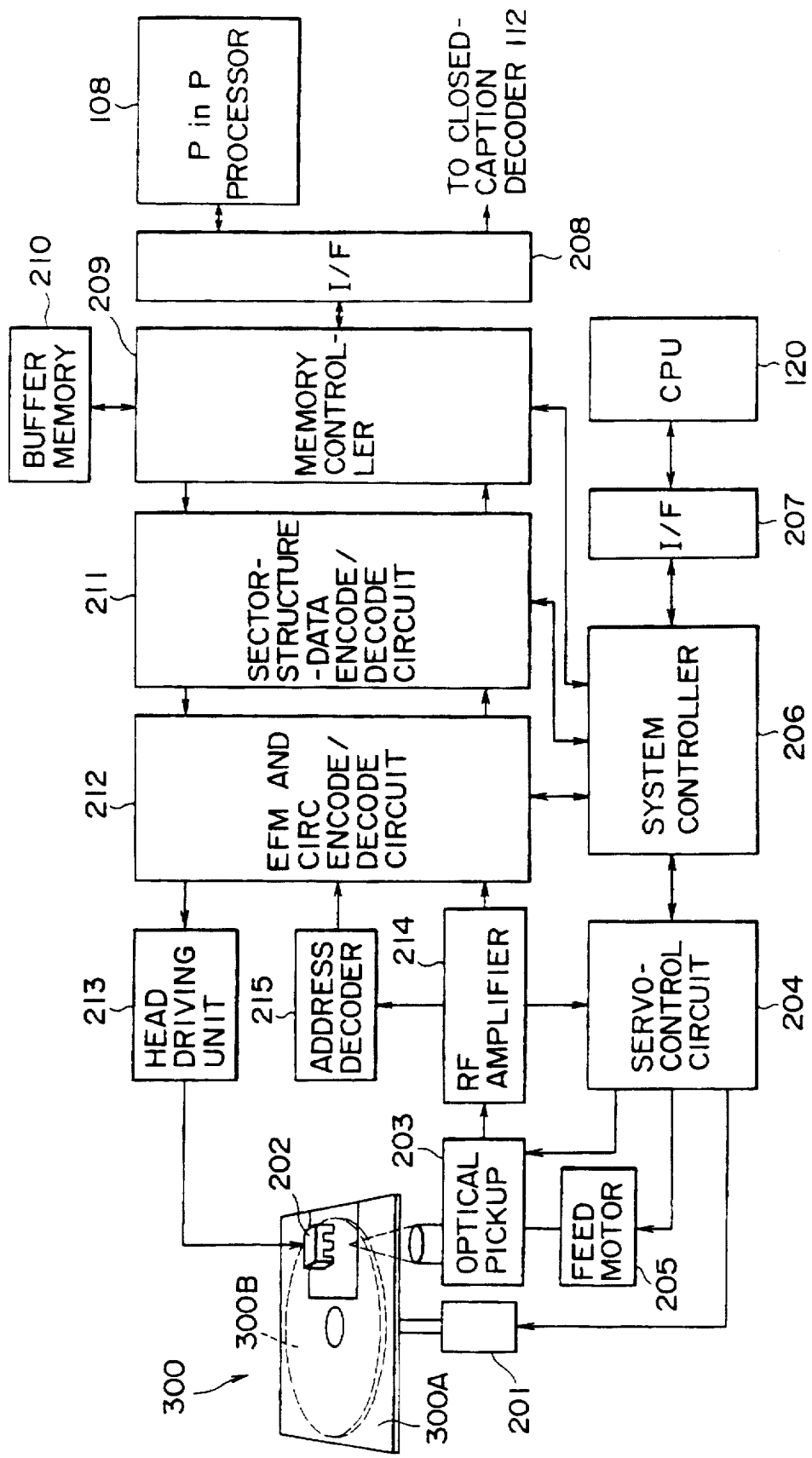
F I G. 3

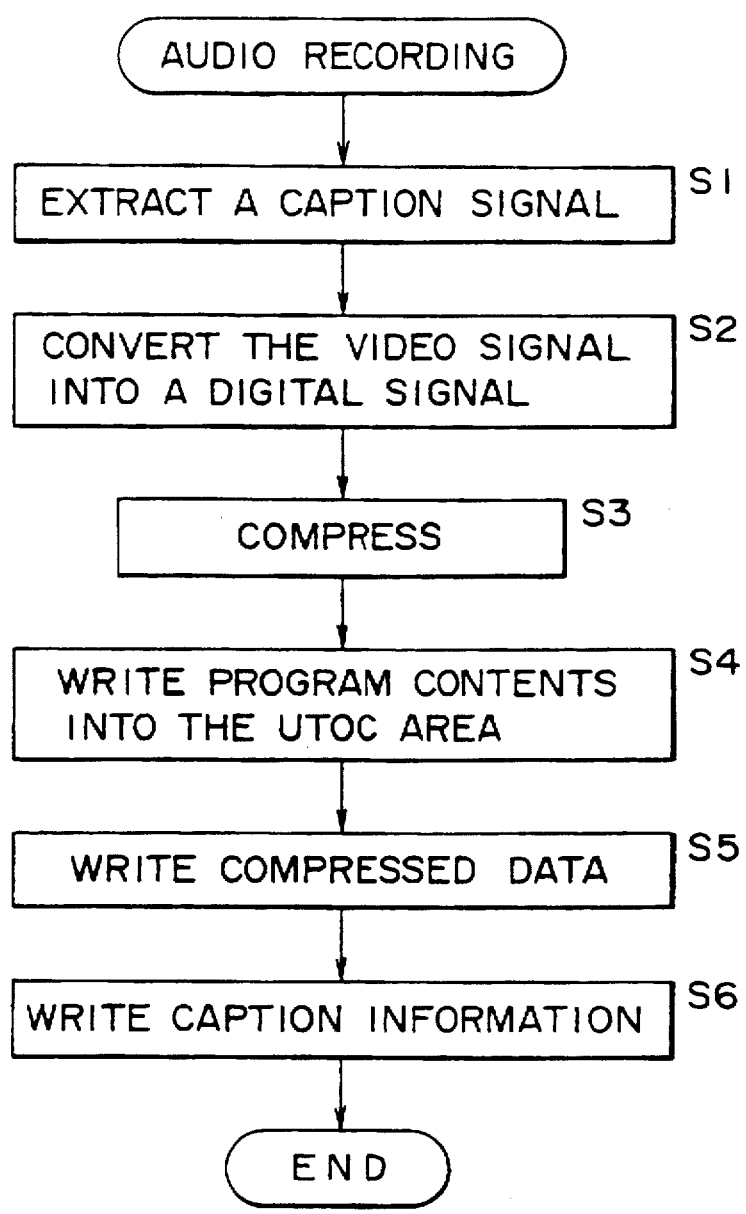

FIG. 7

[TABLE OF VIDEO-RECORDING CONTENTS]

MD NO.7 ⇒ THE NUMBER OF VIDEO-RECORDING PROGRAMS FOR THIS MD IS 8

| PROGRAM | CH | VIDEO-RECORDING DATE | START TIME | VIDEO-RECORDING-TIME LENGTH |
|---|---|---|---|---|
| PLAYED BACK 1 | 8 | 11/25 | 7:00PM | 15 |
| PLAYED BACK 2 | 10 | 11/26 | 8:50PM | 10 |
| 3 | 12 | 11/26 | 10:00PM | 100 |
| 4 | 6 | 11/27 | 3:30AM | 30 |
| PLAYED BACK 5 | 8 | 12/1 | 7:00PM | 55 |
| 6 | 3 | 12/2 | 8:00PM | 10 |
| 7 | 3 | 12/2 | 9:00PM | 60 |
| 8 | 4 | 12/3 | 7:00PM | 10 |

TIME LEFT ⇔ 6

END OF DISPLAY

SELECT A PROGRAM BY MOVING THE DARK LINE UP AND DOWN AND PRESS THE MOUSE DECISION BUTTON TO PLAY BACK THE PROGRAM

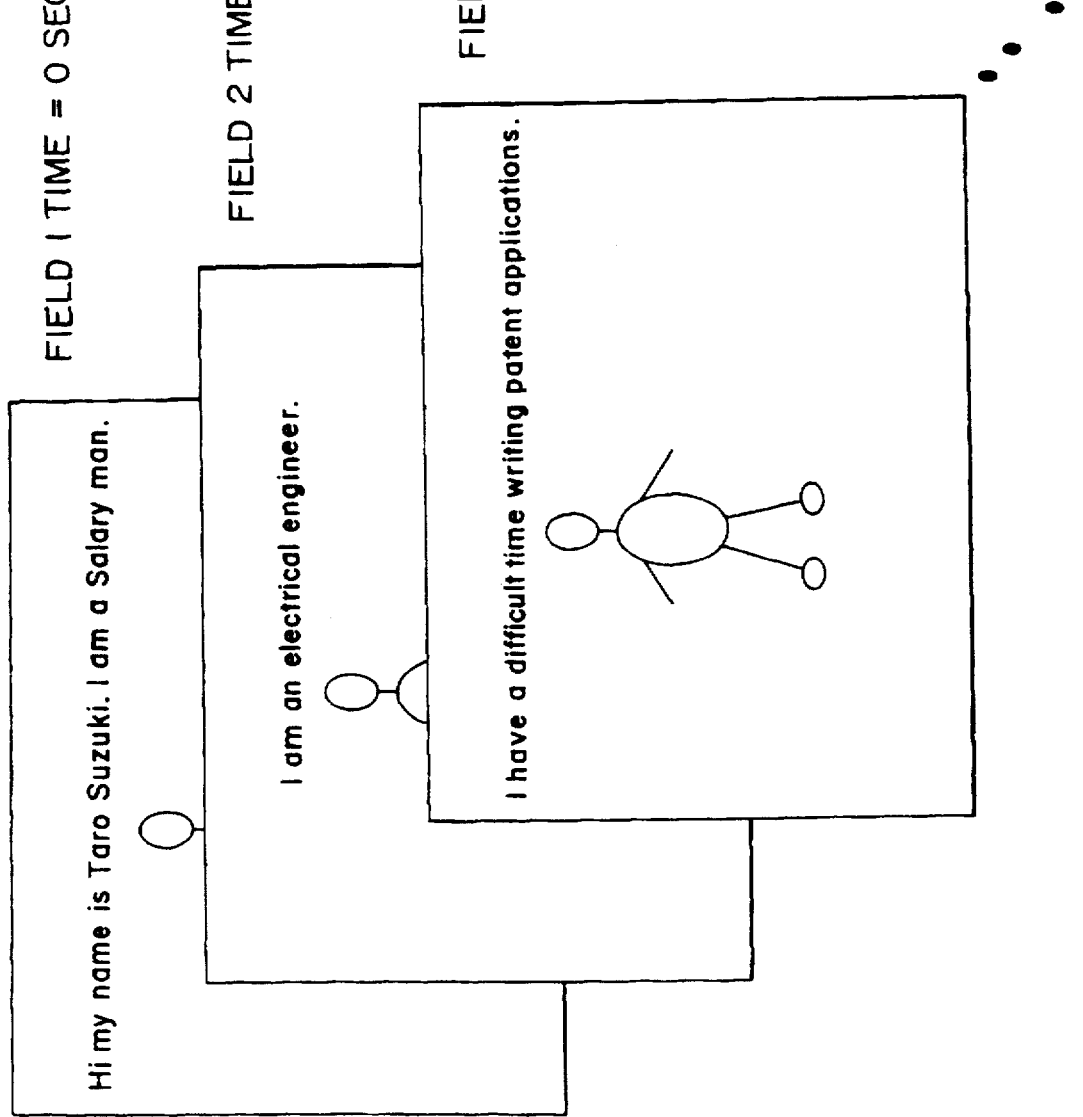

PICTURE RECEIVING APPARATUS

FIELD OF THE INVENTION

The present invention relates to image receiving apparatus employed in a television receiver or the like which can display pictures on a child screen.

BACKGROUND

A video/audio signal which is received by a television receiver and to be recorded into a recording medium may be compressed prior to the recording. Traditionally, when a video/audio signal is compressed, the original video signal undergoes a variety of signal processings carried out in several means in order to decrease the size of the video data resulting from the compression of the video signal.

Picture compressing algorithms proposed by, for example, the MPEG (Moving Picture Image Experts Group) and the JPEG (Joint Photographic Coding Expert Group) or other picture compressing algorithms normally require a playback means for carrying out high-speed playback or rewind-mode playback operations of the compressed video data.

In addition, in spite of the existence of contemporary hardware technologies, the bit stream of compressed video data is at least about 1.5 megabits per second (MBps).

There are also television receivers that have a PinP (picture-in-picture) function allowing a picture to be compressed and displayed on a child screen.

In addition, there are television receivers in each of which a closed-caption decoder is embedded. The closed-caption decoder is used for extracting a caption signal superimposed in vertical blanking periods of a video/audio signal received by the television receiver, allowing characters to be displayed on a television screen synchronously with pictures conveyed in the video/audio signal.

In the future, pictures with captions will not be limited to those of the television broadcasting. Instead, such pictures can be thought as information that is handled by almost all kinds of media such as video software, video disks, package media and cable TVs.

In the case of the conventional picture compressing algorithms, however, a lot of hardware for compressing a video signal and decompressing compressed video data resulting from the compression into the original video signal is required, giving rise to a problem caused by demerits such as an increased cost and an increased size of the picture receiving apparatus.

There is also another problem that, while compressed video data is being played back at a high speed, compressed audio data associated with the compressed video data can not be played back along with the video data.

On the top of that, the bit stream of the compressed data resulting from compression is at least 1.5 MBps, giving rise to still another problem that the data size is large.

SUMMARY OF THE INVENTION

Addressing the problems described above, the present invention is intended to reduce the cost, the amounts of development time and efforts required for picture compression, in the case of recording video and caption signals, by making use of contemporary technologies and hardware which are available at the present time, and also to reduce the cost by utilizing the synergy among already furnished pieces of hardware. On the top of that, with the present invention, all titles included in caption information can also be displayed even while the video signal is being displayed at a high speed or displayed in rewind mode, allowing the contents of the pictures being displayed to be understood by the watcher clearly through the titles. In addition, the displayed pictures can be searched for a particular one that matches a known title.

The present invention provides a picture receiving apparatus which incorporates an extractor for extracting text data superimposed on a video signal; a conversion unit for converting an analog video signal into a digital video signal; a compressor for compressing the digital video signal; a storage unit for storing the text data extracted by the extractor and compressed video data corresponding to a digital compressed video signal resulting from compression carried out by the compressor means; a text reader for reading out the text data stored in the storage unit at a predetermined speed and converting the text data into a corresponding video signal; a picture reader for reading out the video data stored in the storage unit at a predetermined speed and converting the video data into a corresponding video signal; and a display for displaying the text data read out by the text reading means and a picture of the compressed video data read out by the picture reader.

Examples of the extractor, the storage unit, the text reading means and the display means are a closed-caption-data extracting unit 107, an MD drive 111, a closed-caption decoder 112 and a CRT 106 respectively shown in FIG. 2. The conversion unit, the compressor and the picture reader are, on the other hand, implemented by a PinP processor 108 also shown in FIG. 2.

In addition, the present invention also provides a text-information displaying method which includes the steps of extracting text data superimposed on a video signal; converting the video signal into a digital video signal; compressing the digital video signal; storing the extracted text data and the compressed digital video data into a recording medium; reading out the text data stored in the recording medium at a predetermined speed and converting the text data into a corresponding video signal; reading out the digital video data stored in the recording medium at a predetermined speed and converting the video data into a corresponding video signal; and displaying the text data read out from the recording medium and a picture of the compressed digital video data read out from the recording medium on a display.

The present invention provides a picture receiving apparatus and a method for displaying text information, whereby caption information superimposed on a video signal is extracted by the closed-caption data extracting unit 107 and, in the mean time, the video signal is converted into a digital video signal and then compressed by the PinP processor 108 before being stored in the MD drive 111 along with the extracted text data. Then, the caption information stored in the MD drive 111 is read out by the closed-caption decoder 112 at a predetermined speed and a text included in the caption information is displayed on the CRT 106. The video data is, on the other hand, read out by the PinP processor 108 to be displayed also on the CRT 106. In this way, by using existing hardware, a video signal can be compressed and stored along with caption information superimposed on the video signal.

BRIEF DESCRIPTION OF THE DRAWINGS

FIG. 3 is a block diagram showing a detailed configuration of an MD drive 111 shown in FIG. 2;

FIG. 6 is a flowchart used for explaining operations carried out at a video recording time;

FIG. 7 is a diagram showing index information displayed on a screen 100A of a TV 100;

FIG. 9 is a diagram showing full screens on which caption information and pictures are displayed.

DETAILED DESCRIPTION OF THE PREFERRED EMBODIMENTS

Figure 1:
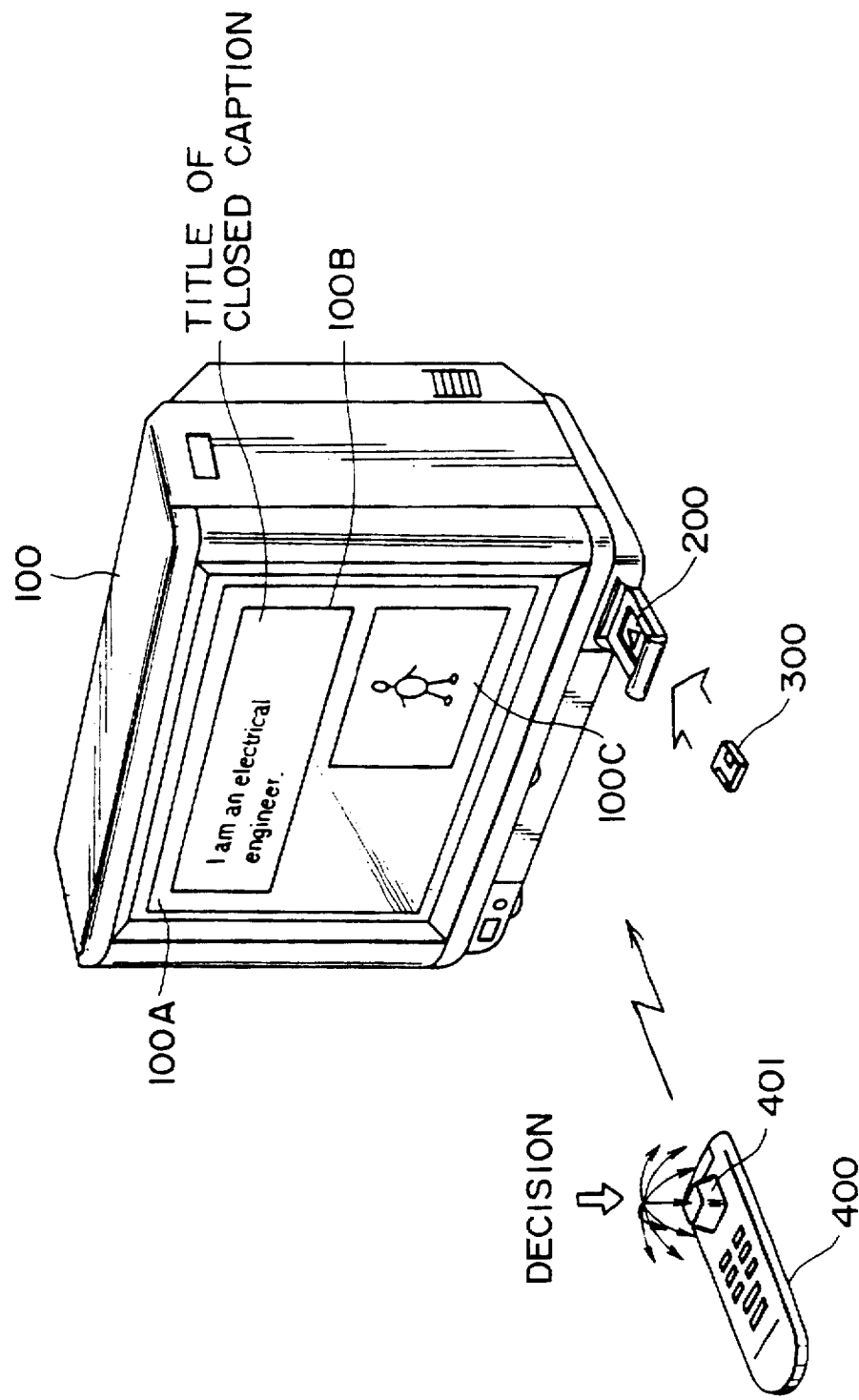
FIG. 1 is a diagram showing an external view of the configuration of an embodiment implementing a video recording/playback apparatus in accordance with the present invention.

FIG. 1 is a diagram showing an external view of the configuration of an embodiment implementing a television receiver 100 and a remote commander 400 controlling a video recording/playback apparatus provided by the present invention. It should be noted that the television receiver 100 is referred to hereafter simply as a TV. In the case of the example shown in the figure, the screen 100A of the TV 100 includes a caption display area 100B located at a predetermined position for displaying a title of a closed caption which title comprises a predetermined line-count, and a child screen 100C at the right lower portion of the screen 100A for displaying a pseudo moving picture.

In addition, as will be described later, the TV 100 is equipped with a minidisk drive, referred to hereafter as an MD drive, for recording and playing back programs received by the TV 100. To be more specific, a program received by the TV 100 can be video-recorded into a minidisk 300 set on a disk mounting unit 200 or a program recorded on the minidisk 300 can be played back and displayed on the screen 100A or the child screen 100C.

At that time, a caption signal superimposed on the video signal of the program is decoded, allowing a title conveyed by the caption signal to be displayed at a predetermined location on the screen 100A.

The remote commander 400 is equipped with a joy-stick button 401 which can be moved in typically eight directions: upward, downward, left, right, left upward, right upward, left downward and right downward. By operating the joy-stick button 401, commands can be given to the TV 100.

Figure 2:
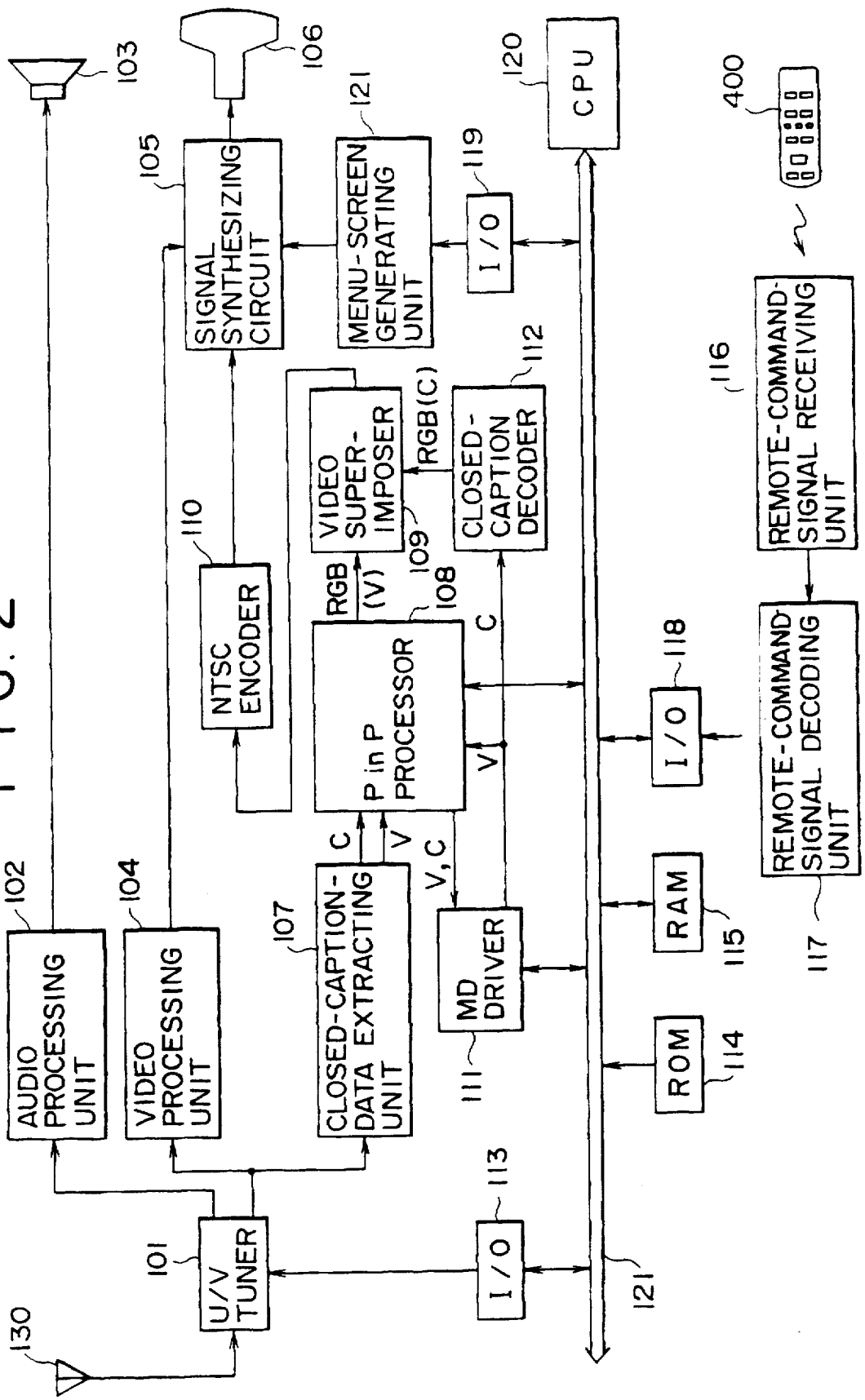
FIG. 2 is a block diagram showing a detailed configuration of the embodiment shown in FIG. 1.

FIG. 2 is a block diagram showing a detailed configuration of the TV 100 shown in FIG. 1. A U/V tuner 101 selects a signal of a channel among signals of broadcast waves received by an antenna 130, supplying a video signal of the selected signal to a video processing unit 104 and a closed-caption-data extracting unit 107 to be described later. An audio signal of the selected signal is, on the other hand, supplied to an audio processing unit 102 also to be described later.

Receiving the audio signal of the selected channel supplied by the U/V tuner 101, the audio processing unit 102 carries out predetermined processing on the audio signal and outputs a result of the processing to a speaker 103.

Receiving the video signal of the selected channel supplied by the U/V tuner 101, the video processing unit 104 carries out predetermined processing on the video signal and outputs a result of the processing to a signal synthesizing circuit 105 to be described later.

The closed-caption-data extracting unit 107, referred to hereafter simply as the CCD extracting unit, extracts a caption signal C superimposed on the vertical blanking periods of the video signal supplied by the U/V tuner 101, supplying the extracted caption signal C to the PinP (Picture-in-Picture) processor 108 to be described later. Likewise, the video signal V itself is also supplied to the PinP processor 108 as well.

The PinP processor 108 converts the video signal V supplied by the CCD extracting unit 107 into a digital RGB signal which is then further compressed thereby before being supplied to a video superimposer 109 and the minidisk drive 111 which is referred to hereafter as an MD drive. It should be noted that the video superimposer 109 and the MD drive 111 will be described later. The caption signal C supplied by the CCD extracting unit 107 is, on the other hand, converted by the PinP processor 108 into a digital signal before being supplied to the MD drive 111.

A closed-caption decoder 112 to be described later converts the caption signal C into an RGB signal for displaying characters conveyed in the caption signal C to be supplied to the video superimposer 109. The video superimposer 109 superimposes the RGB signal on the digital RGB signal supplied by the PinP processor 108 to produce a character-picture signal. As described earlier, the digital RGB signal results from the conversion of the video signal V by the PinP processor 108. The video superimposer 109 supplies the character-picture signal to an NTSC encoder 110 to be described later.

The MD drive 111 records the digital compressed video signal V and the caption signal C supplied by the PinP processor 108 onto a minidisk not shown in the figure. The PinP processor 108 reads back the digital RGB signal from the minidisk, supplying the digital RGB signal to the video superimposer 109 as described earlier. The PinP processor 108 also reads back the caption signal C from the minidisk, supplying the caption signal C to the closed-caption decoder 112 as described earlier.

The closed-caption decoder 112 converts a digital signal corresponding to the caption signal C supplied from the MD drive 111 into the RGB signal for displaying characters conveyed in the caption signal C. The RGB signal is then supplied to the video superimposer 109.

The NTSC encoder 110 converts the video signal V and the RGB signal for displaying characters supplied by the video superimposer 109 for the child screen 100C into an NTSC signal which is then supplied to a signal synthesizing circuit 105 to be described later.

A menu-screen generating unit 121 generates an analog signal of the NTSC system representing a menu screen in accordance with data or a control signal supplied by a CPU 120 through an I/O port 119 and supplies the analog NTSC signal to the signal synthesizing circuit 105.

The signal synthesizing circuit 105 passes on the analog NTSC signal representing a menu screen supplied by the menu-screen generating unit 121 to a CRT 106. In addition, the signal synthesizing circuit 105 synthesizes a video signal supplied by the video processing unit 104 and the NTSC signal supplied by the NTSC encoder 110 for the child screen 100C, supplying the synthesized signal to the CRT 106.

An I/O port 113 receives a control signal from the CPU 120 through a bus 121. The control signal is passed on to the U/V tuner 101, requesting the U/V tuner 101 to select a channel.

A ROM unit 114 is used for storing system programs and data whereas the RAM unit 115 is used for storing application programs and data. The CPU 120 controls components in accordance with the system and application programs stored in the ROM and RAM units 114 and 115 respectively.

The remote commander 400 transmits a signal, typically an infra-red signal to represent an operation carried out on the remote commander 400. A remote-commander-signal receiving unit 116 of the TV 100 receives the signal transmitted by the remote commander 400, passing on the signal to a remote-commander-signal decoding unit 117. The remote-commander-signal decoding unit 117 decodes the signal supplied by the remote-commander-signal receiving unit 116, converting it into a control signal which is then supplied to the CPU 120 through the I/O port 118 and the bus 121.

FIG. 3 is a block diagram showing a detailed configuration of the MD drive 111 shown in FIG. 2. The minidisk 300 comprises a disk 300B having a diameter of 64 mm and a cartridge 300A for accommodating the disk 300B. The cartridge 300A protects the disk 300B against dust and prevents the disk 300B from being damaged. A pregroup for light-spot control (or tracking control) is created in advance on the disk 300B. In the case of this example, in particular, absolute-address data is recorded by superimposing on a wobbling signal for tracking of this pregroup.

The disk 300B is rotated by a spindle motor 201. The rotation of the spindle motor 201 is controlled by a servo control circuit 204 in such a way that the disk 300B is rotating at a constant linear speed.

A shutter not shown in the figure is provided on the disk cartridge 300A in such a way that, when the disk cartridge 300A is mounted on a disk mounting unit 200, the shutter is opened. A recording magnetic head 202 is provided on the upper portion of the shutter opening of the disk 300B and an optical pickup 203 is positioned on the lower portion of the shutter opening of the disk 300B, facing the recording magnetic head 202.

The optical pickup 203 is controlled and driven by a feed motor 205 in the radius direction of the disk 300B. In addition, focus control and tracking control of the optical pickup 203 are carried out by the servo control circuit 204.

A system controller 206 has an embedded microcomputer for exchanging, among other information, control signals and UTOC data to be described later with the CPU 120 through an interface (I/F) 207, controlling other components. In addition, the modes of units are changed from one to another by a mode switch signal generated by the system controller 206 during recording and playback operations.

A video signal V input to a memory controller 209 from the PinP processor 108 through an I/F 208 is supplied to a buffer memory unit 210 which is controlled by the memory controller 209. The video signal V is stored in the buffer memory unit 210 temporarily.

If no track jump occurs due to vibration or the like during a recording operation, causing a recording position on the disk 300B to be skipped, the memory controller 209 sequentially reads out the compressed video signal V from the buffer-memory unit 210 at a transfer speed about five times the write speed. The data read out from the buffer-memory unit 210 is supplied to a data encode/decode circuit 211 of the sector structure.

If a track jump occurring in the course of a recording operation is detected, the memory controller 209 terminates the transfer of data to the data encode/decode circuit 211, supplying compressed data from the interface 208 to the buffer-memory unit 210 to be stored therein. When the recording position is corrected, the data stored in the buffer-memory unit 210 is read out and supplied to the data encode/decode circuit 211.

The data encode/decode circuit 211 encodes the compressed data received from the buffer-memory unit 210 into data of the sector structure of the CD-ROM. It should be noted that 36 sectors including data of 32 sectors are referred to hereafter as a cluster. As will be described later, data is recorded or played back in cluster units.

Data output by the data encode/decode circuit 211 is supplied to an EFM & CIRC encode/decode circuit 212. It should be noted that the EFM is an abbreviation for Eight to Fourteen Modulation known as 8–14 modulation whereas the CIRC is an abbreviation for Closed Interleave Read Solomon Code. In the EFM & CIRC encode/decode circuit 212, an encoding process for data-error detection and correction is carried out in addition to modulation appropriate for recording. In this case, modulation appropriate for recording is EFM processing. In this example, ACIRC (Add-on Interleave+CIRC) with its interleave modified for the CD's CIRC is used as a code for the error detection and correction.

Recorded data is intermittent data. A total of 4 sectors for linking clusters to each other are added before and after the 32-sector data. The four sectors are referred to hereafter as linking sectors. The four linking sectors and the 32 sectors for recording data or a total of 36 sectors constitute one cluster of recording data. It should be noted that the circuits 211 and 212 can be integrated into a single IC.

Recorded data formed in this way are supplied to the recording magnetic head 202 through a head driving circuit 213. A magnetic field modulated by the recorded data supplied to the recording magnetic head 202 is applied to a disk (an optical magnetic disk) 300B. At the same time, a laser beam from the optical pickup 203 is applied to the disk 300B.

The optical pickup 203 comprises optical components including a laser light source such as a laser diode, collimator lens, an object lens, polarizing beam splitter and a cylindrical lens, a photo diode and other components. In a recording operation, a laser light with a fixed power greater than that used during a playback operation is generated. Data is recorded on the disk 300B by the applied laser light and the magnetic field modulated by the magnetic head 202 in a thermal magnetic recording process. The recording magnetic head 202 and the optical pickup 203 can be moved synchronously with each other in the radius direction of the disk 300B.

In addition, in a recording operation, the output of the optical pickup 203 is supplied to an address decoder 215 through an RF amplifier 214. The address decoder 215 extracts and decodes absolute-address data wobble-recorded on a pregroup provided along the track of the disk 300B. The detected absolute-address data is supplied to the EFM & CIRC encode/decode circuit 212 to be inserted into the recording data and recorded on the disk 300B. In addition, the absolute-address data is supplied also to the system controller 206 for verification of recording positions and position control.

In addition, a signal from the RF amplifier 214 is supplied to the servo control circuit 204 in which a control signal for sustaining the linear speed of the spindle motor 201 at a constant value is created from the signal originated from the pregroup of the disk 300B. The control signal is used for controlling the spindle motor 201.

Figure 4:
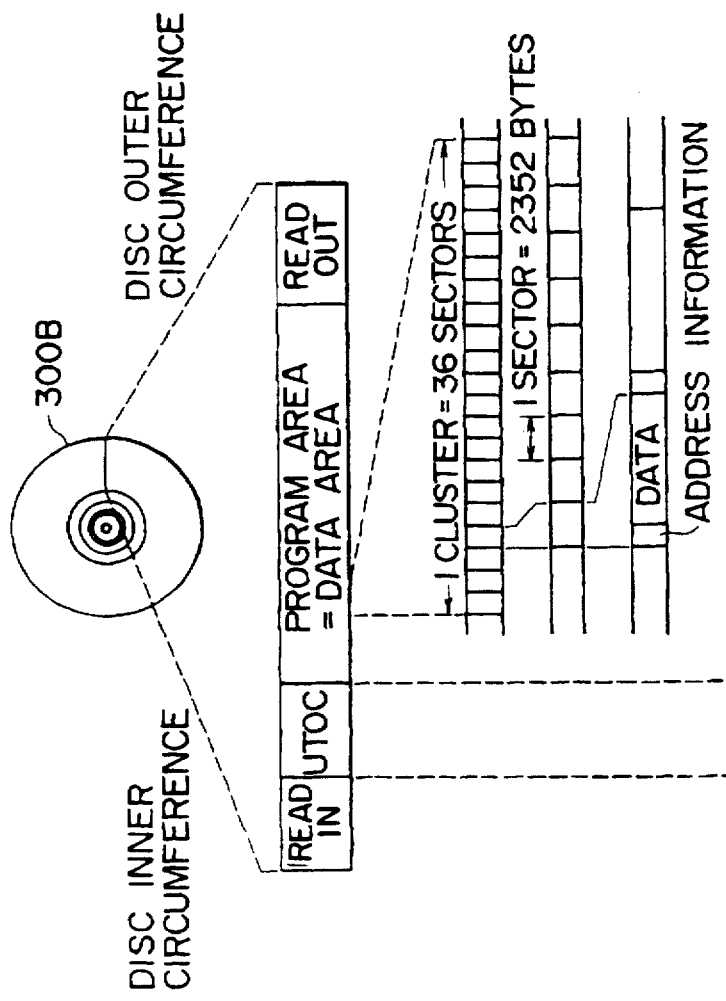
FIG. 4 is a diagram showing the recording format of a minidisk mounted on the MD drive 111 shown in FIG. 3.

FIG. 4 is a diagram showing the recording format of the disk 300B. The innermost circle of the disk 300B is used as a read-in area followed by a UTOC (User Table of Contents) area into which the user can write data. The UTOC area is followed by a data area. Finally, the outermost circle of the disk 300B is a read-out area.

The UTOC area is used for recording segment allocation table information on the utilization status of cluster groups in the data area on the disk 300B. The information allows data files recorded on the disk 300B to be controlled.

Each file has an entry provided in the segment allocation table. As shown in FIG. 4, each entry comprises a File-Name field, an Attribute field showing the attributes of the file, a Date field showing the recording date and time of the file, a Start-Cluster field showing the head cluster of the file, a Length field showing the data size of the file and a Link-Pointer field showing a start cluster in a next data area in the case of a file recorded in non-contiguous areas comprising this data area and the next data area.

In addition, the identification number of the minidisk and index information on recording contents such as a program number, a channel number, a recording start time, a recording time length and the number of recorded programs are also recorded as well. Furthermore, information indicating the end of a playback operation in the case of data reproduction is also recorded as will be described later.

Next, a playback operation is explained. Much like the recording operation described above, in a playback operation, the spindle motor 201 is controlled by the signal from the pregroup output by the servo control circuit 204 in such a way that the disk 300B rotates at the same constant linear speed as the recording operation.

During a playback operation, the optical pickup 203 detects a reflected laser light which was applied to a target track in order to detect a focus error by using the astigmatism method. In addition, by using typically the push-pull technique, a tracking error and a difference in polarization angle of the light reflected from the target track are detected to output a playback RF signal.

A signal output by the optical pickup 203 is supplied to the RF amplifier 214 which detects a focus-error signal and a tracking-error signal from the supplied signal. The focus-error and tracking-error signals are supplied to the servo control circuit 204 and the playback signal is converted into binary signal before being supplied to the EFM & CIRC encode/decode circuit 212.

The servo control circuit 204 carries out focus control on the optical system of the optical pickup 203 in such a way that the value of the focus-error signal becomes a zero. At the same time, the servo control circuit 204 carries out track control on the optical system of the optical pickup 203 in such a way that the value of the track-error signal becomes a zero.

A signal output by the RF amplifier 214 is supplied to the address decoder 215 in which absolute-address data is extracted and decoded. The absolute-address data output by the address decoder 215 is then supplied to the system controller 206 through the EFM & CIRC encode/decode circuit 212. The absolute-address data is used by the servo control circuit 204 in the playback position control in the disk radius direction of the optical pickup 203. In addition, the system controller 206 can use address information of a sector unit extracted from the playback data for controlling the position on a recording track scanned by the optical pickup 203.

In a playback operation, time-axis-compressed data read out from the disk 300B is written into the buffer-memory unit 210, read back and time-axis-decompressed. Since the data is written into the buffer-memory unit 210 and read therefrom at different transfer rates, the operation to read data from the buffer-memory unit 210 is carried out intermittently by the optical pickup 203 so that the amount of data accumulated therein does not go below a predetermined value.

A signal supplied to the EFM & CIRC encode/decode circuit 212 through the RF amplifier 214 undergoes modulation and error correction. A signal output by the EFM & CIRC encode/decode circuit 212 is supplied to the data encode/decode circuit 211 of the sector structure in which the sector structure of the minidisk is resolved and the data is decoded into the original data in the time-axis-compressed state.

A signal output by the data encode/decode circuit 211 of the sector structure is transmitted through the memory controller 209 to the buffer-memory unit 210 to be stored temporarily therein. Then, if no track jump occurs due to vibration or the like during a playback operation, the memory controller 209 sequentially reads out the data in the compressed state originated by the data encode/decode circuit 211 of the sector structure from the buffer-memory unit 210 at a transfer speed about one-fifth times the write speed. The data read out from the buffer-memory unit 210 is supplied to the PinP processor 108 through an interface 208.

In this case, in a normal operation, the memory controller 209 exercises memory control in such a way that a predetermined amount of data greater than a required minimum limit is accumulated in the buffer-memory unit 210 whenever possible. When the amount of data accumulated in the buffer-memory unit 210 becomes smaller than a predetermined amount set in advance, for example, the memory control is carried out by taking in data intermittently by means of the optical pickup 203 from the disk 300B and writing the data from the data encode/decode circuit 211 into the buffer-memory unit 210 so that a read space greater than a predetermined amount of data is always retained in the buffer-memory unit 210.

As described above, the video signal V played back by the MD drive 111 and supplied to the PinP processor 108 is fed to the video superimposer 109. On the other hand, the caption signal C played back by the MD drive 111 is supplied to the video superimposer 109 through a closed-caption decoder 112. A signal output by the video superimposer 109 is supplied to a CRT 106 through an NTSC encoder 110 and the signal synthesizing circuit 105 in order to display a pseudo moving picture and a title included in the caption information on the child screen 100C.

In the case of the television receiver (TV) 100 described above, the user can operate the remote commander 400 in order to select a channel, to video-record a program onto the minidisk 300 by means of the MD drive 111 or to play back a program recorded on the minidisk 300 by the MD drive 111.

Figure 5:
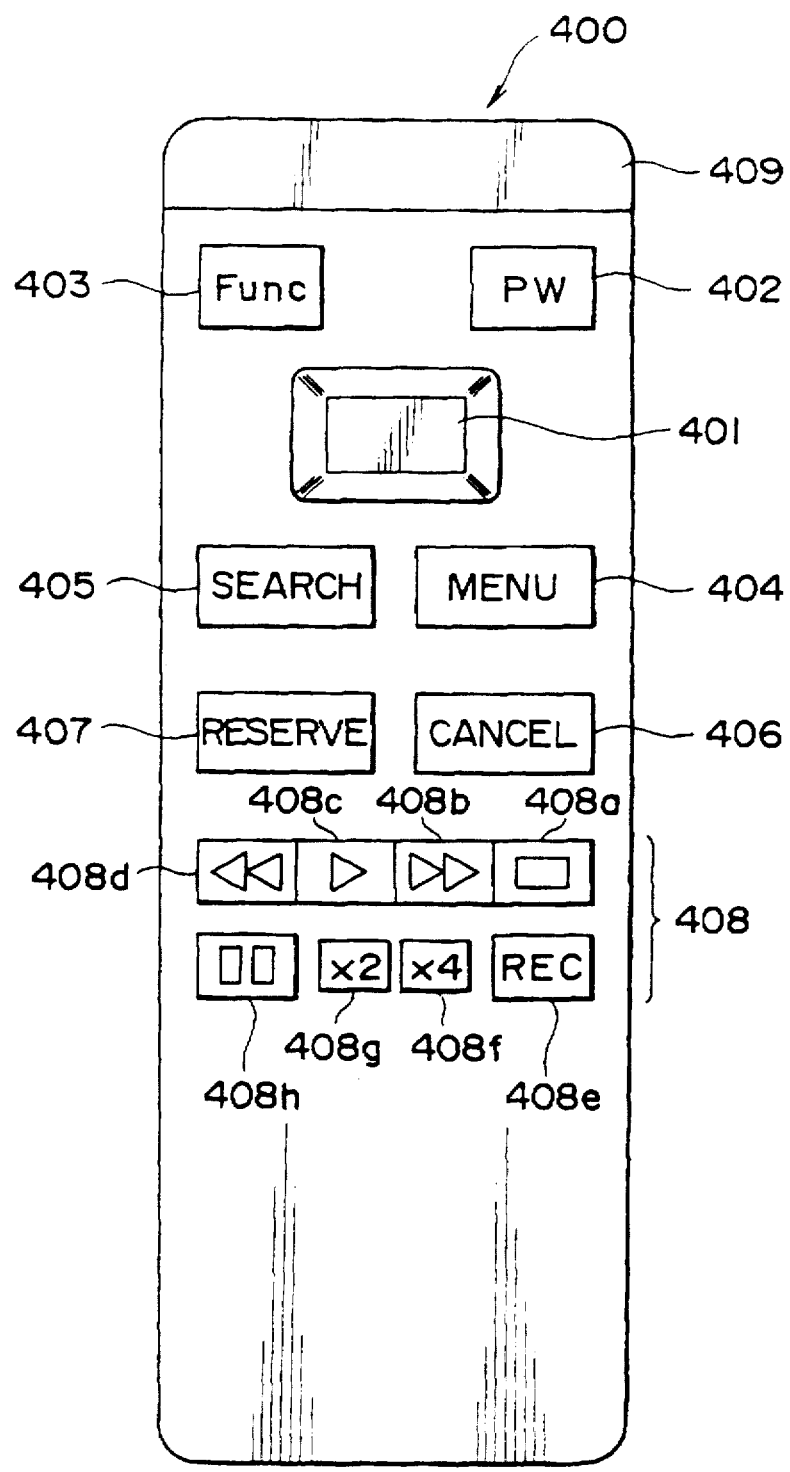
FIG. 5 is a diagram showing an external-view of the button configuration of a remote commander 400.

FIG. 5 is a diagram showing an external view of the button configuration of the remote commander 400. A power-supply button 402 is a button used for turning on the power supply of the TV 100. A function switching button 403 is a button for switching a function of the TV 100. The joy-stick button 401 can be moved in eight directions: upward, downward, left, right, left upward, right upward, left downward and right downward to place a displayed cursor at a predetermined position on a menu screen of the screen 100A of the TV 100. A menu item at the predetermined position is thereby selected. By pressing the button down, the selected menu item can be confirmed. In this way, the joy-stick button functions as a decision button.

A menu button 404 is used for instructing the TV 100 to display a menu screen on the screen 100A of the TV 100. A search button 405 is used for searching for a program. A cancel button 406 is used for canceling a function. A reserve button 407 is used for reserving the video recording of a program.

Recording/playback buttons 408 are used for operating the MD drive 111. Typically, the recording/playback buttons 408 include a halt button 408a, a fast-feed button 408b, a playback button 408c, a rewind button 408d, a record (REC) button 408e, a quadruple-speed button 408f for specifying a playback operation at a quadruple speed, a double-speed button 408g for specifying a playback operation at a double speed, a temporary-halt button 408h for specifying a temporary halt.

When one of the buttons described above is operated, a transmitter unit 409 transmits typically an infra-red light as a remote-commander signal corresponding to the button.

Operations to record a program on the MD drive 111 are explained by referring to a flowchart shown in FIG. 6. Let a program of a channel be displayed on the screen 100A of the TV 100. In this case, when the record button 408e of the remote commander 400 is pressed down, for example, the transmitter unit 409 transmits a light such as an infra-red light as a remote-commander signal requesting a recording operation. The remote-commander signal is received by a remote-commander-signal receiving unit 116 of the TV 100.

The light serving as the remote-commander signal received by the remote-commander-signal receiving unit 116 from the remote commander 400 is converted into an electrical signal which is then supplied to the remote-commander-signal decoder 117. The remote-commander-signal decoder 117 converts the electrical signal received from the remote-commander-signal receiving unit 116 into a control signal to be supplied to the CPU 120 through an I/O port 118. The CPU 120, in turn, controls components in accordance with the control signal received from the remote-commander-signal decoder 117.

First of all, at a step S1, the CCD extracting unit 107 extracts a caption signal C superimposed on the vertical blanking periods of a video signal supplied by the U/V tuner 101. In the case of the NTSC system, two bytes of caption information are superimposed on Line 21 of Field 1. Of course, in the case of the PAL or SECAM system, caption information is superimposed on a line of a field much like the NTSC system.

Accordingly, two bytes of caption information are superimposed on each frame to give a maximum data speed of 60 bytes per second. The extracted caption signal C is supplied to the PinP processor 108 along with the video signal V. In other words, caption information of the amount of 2 bytes per frame is supplied to the PinP processor 108.

In addition to extracting the caption information, the CCD extracting unit 107 can also generate vertical and horizontal synchronization timing signals required by the PinP processor 108.

Next, the processing flow continues to a step S2, at which the video signal V supplied by the CCD extracting circuit 107 is sampled by the PinP processor 108 at a predetermined sampling frequency to be converted into digital video data. The sampling frequency can be changed in accordance with a compression factor required.

Next, the processing flow continues to a step S3, at which the digital video data is compressed by the PinP processor 108. In general, the video signal V which is input as an analog signal passes through a low-pass filter not shown in the figure whereby only low-frequency components of the video signal V are passed. The video signal V is then split into luminance and color difference signals which are then converted into 6-bit digital data having a typical resolution.

As is generally known, the video signal is split into Y, U and V or Y, R-Y and B-Y formats and, in order to reduce the size of the data, the luminance signal Y and the color difference signals (U and V or R-Y and B-Y) are sampled at frequencies different from each other. Taking advantage of the fact that the sense-of-sight system of a human being is sensitive to luminance but not so sensitive to colors, the sampling technique adopting different frequencies is used to reduce the amount of color difference information. In general, the ratio of allowable bandwidths of the luminance signal and the color difference signals is 4:1:1 or 4:2:2.

In the case of 180×100 pixel elements, 4:1:1 demodulation and a 6-bit resolution, the data speed is about 170 kBps which is about one-tenth of the conventional value. As a result, the data can be recorded in almost all kinds of recording media in use at the present time.

The processing flow then continues to a step S4 at which the CPU 120 requests the MD drive 111 to record information on video-recording contents such as a program number, a channel number, a video-recording date, a video-recording start time, a video-recording length, a video-recordable time (or the minidisk's remaining space), the identification number of the minidisk 300 and the number of video-recorded programs in the UTOC area on the disk 300B of the minidisk 300. The MD drive 111 records information on video-recording contents in the UTOC area on the disk 300B in accordance with the instruction given by the CPU 120. The menu screen shown in FIG. 7 will be explained later.

The processing flow then continues to a step S5 to supply the video signal V compressed by the PinP processor 108 to the MD drive 111. The MD drive 111 writes the video data supplied by the PinP processor 108 into the disk 300B at a predetermined address.

The processing flow then continues to a step S6 to supply the caption signal C converted into a digital signal by the PinP processor 108 to the MD drive 111. The MD drive 111 writes the video data supplied by the PinP processor 108 into the disk 300B at a predetermined address, completing the processing.

Pictures and caption information of a program supplied by a channel selected by the U/V tuner 101 in this way are recorded on the disk 300B and, at the same time, its index information including, among other pieces of data, the program number, the channel number, the video-recording date, the start time and the video-recording length described earlier is written into the UTOC area.

Figure 8:
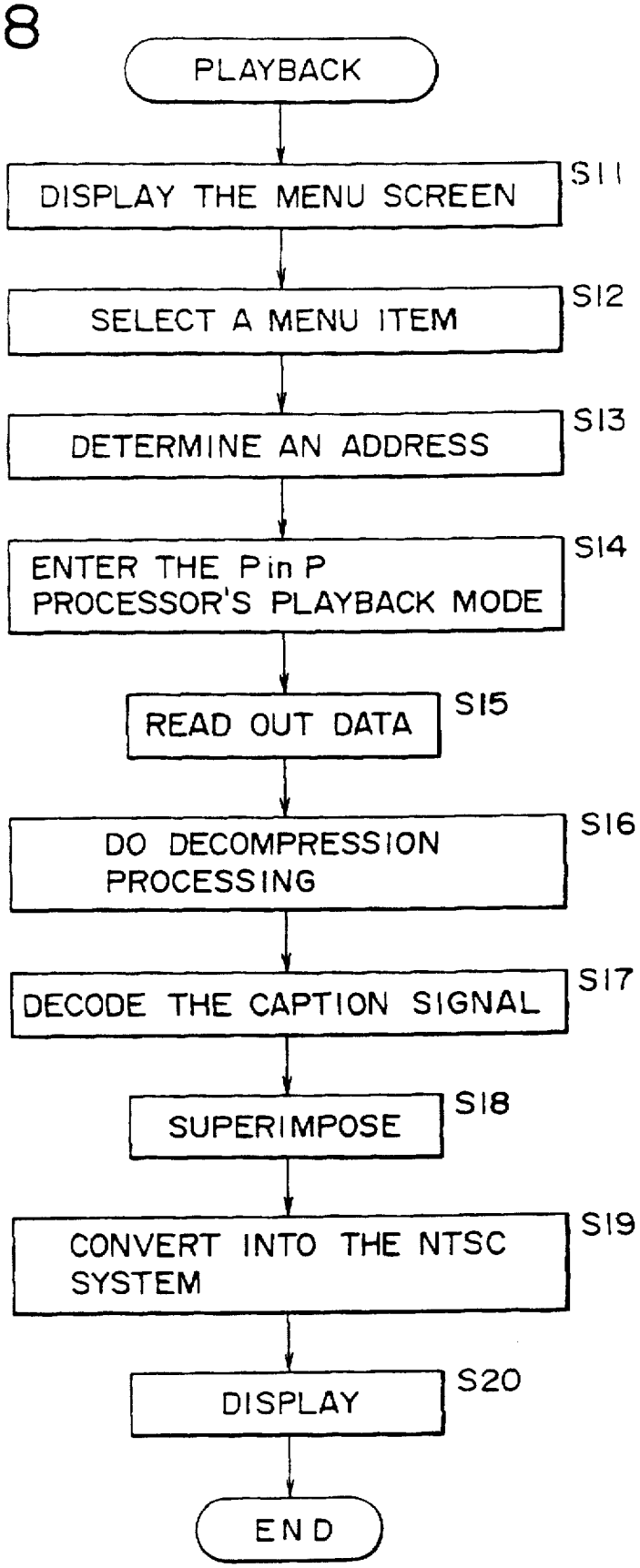
FIG. 8 is a flowchart used for explaining operations carried out at a playback time.

Next, operations to select a program among those video-recorded on the minidisk 300 and to display the selected program on the screen 100A of the TV 100 are explained by referring to a flowchart shown in FIG. 8.

First of all, at a step S11, when the menu button 404 of the remote commander 400 is pressed down, a menu screen such as one shown in FIG. 7 is displayed on the screen 100A of the TV 100 by a menu-screen generating unit 121 controlled by the CPU 120. As shown in the figure, the identification number of the minidisk 300 mounted on the MD drive 111, the number of programs recorded on the minidisk 300 and indexes for contents of the recorded programs read out from the minidisk 300 are displayed.

As described above, a program index typically comprises a program number, a channel number, a video-recording date, a video-recording start time and a video-recording time length. In addition, on the line of an already played back program, a character string 'Played back' is displayed. When a program has been played back, a character string 'Played back' is recorded in the UTOC area of the disk 300 for the played back program. When this menu screen is displayed, the character string 'Played back' is read out. A dark cursor is displayed on the line of a program without the character string 'Played back'. If there are more than one program without the character string 'Played back', the cursor is typically placed on the line of a program with the lowest program number.

At a step S12, the cursor is moved up and down by operating the joy-stick button 401 of the remote commander 400 and placed on the line of a program to be played back. Next, the joy-stick button 401 is pressed down to confirm the selection of the program indicated by the cursor. At that time, the joy-stick button 401 functions as a decision button.

As the selected program is confirmed, a light is emitted from the transmitter unit 409 of the remote commander 400 and received by the remote-commander-signal receiving unit 116 of the TV 100. A remote-commander-signal receiving unit 116 converts the light transmitted by the remote commander 400 into an electrical signal, passing on the electrical signal to the remote-commander-signal decoding unit 117. The remote-commander-signal decoding unit 117 decodes the signal supplied by the remote-commander-signal receiving unit 116, converting it into a control signal which is then supplied to the CPU 120 through the I/O port 118. Receiving the control signal, the CPU 120 recognizes the program selected by the cursor, providing instructions to units.

Then, the processing flow continues to a step S13 at which the CPU 120 uses index information recorded in the UTOC area to determine the cluster, sector and address at which the selected program is recorded. The determined address is then supplied to a system controller 206 through an interface 207.

Then, the processing flow continues to a step S14 at which the PinP processor 108 switches to a playback mode. Subsequently, the processing flow continues to a step S15 at which the system controller 206 of the MD drive 111 controls an operation to read out a compressed video signal V and a caption signal C of the program recorded at an area indicated by the cluster, sector and address from the disk 300B. The video signal V is supplied to the PinP processor 108 whereas the caption signal C is supplied to a closed-caption decoder 112.

Then, the processing flow continues to a step S16 at which the PinP processor 108 carries out video processing such as decompression, that is, smoothing or averaging on the compressed video data received from the MD drive 111 before supplying the processed data to the video superimposer 109.

At a step S17, the caption information supplied to the closed-caption decoder 112 is converted by a character generator embedded in the closed-caption decoder 112 into an RGB signal for displaying characters corresponding to the caption information. The RGB signal is also supplied to the video superimposer 109.

The processing flow then proceeds to a step S18 at which the video superimposer superimposes the RGB signal for displaying characters corresponding to the caption information on the video signal supplied by the PinP processor 108, supplying the result of the superimposition to the NTSC encoder 110.

At a step S19, the NTSC encoder 110 converts the RGB signal supplied thereto into an analog signal of the NTSC system, supplying the analog signal to the signal synthesizing circuit 105. The signal synthesizing circuit 105 synthesizes the video character signal supplied by the NTSC encoder 110 and a video signal supplied by the video processing unit 104, supplying a synthesized video signal to the CRT 106.

The processing flow proceeds to a step S20 at which the CRT 106 displays pictures of the program read out from the minidisk 300 on a child screen 100C typically located at the right lower portion of the screen 100A of the CRT 106. In addition, characters included in the caption information added to the pictures are displayed on predetermined lines, typically on one line, on the upper half of the screen 100A. The number of lines can be changed depending upon the playback speed of the MD drive 111.

Let, for example, the double-speed button 408g of the remote commander 400 be pressed down in the course of a playback operation at a normal speed to request a double-speed playback operation. In response to the request, the MD drive 111 carries out a double-speed playback operation, producing caption information added to played back pictures with an amount twice as much the amount produced at the normal speed. As a result, caption information with an amount twice as much the normal-speed amount is displayed on two lines on the screen 100A. Likewise, let the quadruple-speed button 408f of the remote commander 400 be pressed down in the course of a playback operation at a normal speed to request a quadruple-speed playback operation. In response to the request, the MD drive 111 carries out a quadruple-speed playback operation, producing caption information added to played back pictures with an amount four times as much the amount produced at the normal speed. As a result, caption information with an amount four times as much the normal-speed amount is displayed on four lines on the screen 100A.

By carrying out a double-speed or quadruple-speed playback operation in this way, all caption information added to pictures can be displayed without losing part of the information even if predetermined frames of the original pictures are thinned out.

As a result, in a double-speed playback operation, the contents of a video-recorded program can be understood in half the time required by the normal-speed playback operation. Similarly, in a quadruple-speed playback operation, the contents of a video-recorded program can be understood in a quarter of the time required by a normal-speed playback operation. On the top of that, if the playback speed is made higher than the normal speed as described above, audio information that would naturally output while pictures are being displayed is displayed as titles, allowing the audio information to be all recognized by reading the titles. As a result, it is not necessary to record audio information, allowing the size-of compressed data to be reduced.

FIG. 9 is a diagram showing played back pictures displayed as full screens on the screen 100A wherein caption information is displayed on 1 line. The figure shows a relation between pictures and caption information displayed on the screen 100A and the elapsed time. As shown in the figure, with the lapse of time, pictures are displayed and caption information for the pictures is displayed at a predetermined position on the screen.

In the embodiment described above, a minidisk and an MD drive are employed. It should be noted, however, that the recording media and the storage device are not limited to the minidisk and the MD drive respectively. A floppy disk, a hard disk, an optical magnetic disk (MO disk), a digital audio tape (DAT), a RAM, a RAM disk, an EEPROM, an IC card, a digital video disk (a DVD), a digital video tape recorder (a DVTR) as well as other recording media and storage devices can also be employed as well.

According to the present invention, caption information superimposed on a video signal is extracted by an extraction means whereas the video signal is converted into a digital video signal and then compressed by a compression means before being stored in a storage means along with the extracted text data. In addition, the caption information stored in the storage means is read out by a text-data reading means at a predetermined speed to display a title included in the caption information on a display means. On the other hand, the video data is read out by the compression means to be displayed also on the display means. As a result, by using the existing hardware, it is possible to compress the video signal and to store the compressed video signal along with caption information superimposed thereon. On the top of that, pictures can be compressed and the compressed pictures can be recorded and displayed at a low cost.

In addition, since the digital video signal is compressed by thinning out predetermined picture elements of the digital video signal or eliminating predetermined frames, or both, no special hardware for the compression is required, allowing the cost of the apparatus to be reduced. As a result, no new technology is required, making it possible to minimize the amount of development time and the amount of development effort.

On the top of that, since the speed to read out data from the storage means is specified by the read-speed specifying means, fast-feed playback and rewind playback operations can be carried out. As a result, the time required to watch recorded pictures can be shortened.

Furthermore, since the number of texts to be displayed on the display means or the number of display lines can be changed by the text display control means in accordance with the speed to read out data, the number of display lines for a title included in the caption information can be increased in a fast-feed operation to play back video data, allowing the entire caption information to be displayed on the display means. As a result, the entire caption information superimposed on pictures can be read regardless of the playback speed. On the top of that, it is possible to search the pictures for a desired one by reading the caption information.

Moreover, the index-information displaying means displays index information stored along with the video information on the display means. The selection means is then used for selecting a desired picture from the index information and a text associated with the selected picture is then displayed, allowing the desired picture to be played back immediately. As a result, the amount of wasted time in a playback operation can be minimized.

Further, since the display means displays the compressed video data on a child screen 100C, the quality of the pictures can be sustained. As a result, the compressed video data can be displayed by using the existing hardware, allowing the cost of the apparatus to be reduced.

What is claimed is:

1. A picture receiving apparatus for receiving a signal comprising a video signal and text information corresponding to pictures conveyed in said video signal and for displaying said pictures along with said text information, wherein said text information is superimposed on said video signal, comprising:

extraction means for extracting text data corresponding to said text information superimposed on said video signal;

conversion means for converting said video signal into a digital video signal;

compression means for compressing said digital video signal into compressed video data;

storage means for storing said text data extracted by said extraction means and said compressed video data resulting from compression carried out by said compression means;

text reading means for reading out said text data stored in said storage means at a first predetermined speed and converting said text data into a corresponding video text signal;

picture reading means for reading out said compressed video data stored in said storage means at a second predetermined speed and converting said compressed video data into a corresponding video picture signal; and display means for displaying said video text signal from said text reading means and said video picture signal from said picture reading means.

2. A picture receiving apparatus according to claim 1, wherein said compression means compresses said digital video signal by at least one of thinning out predetermined picture elements of said digital video signal, and by eliminating predetermined frames of said digital video signal.

3. A picture receiving apparatus according to claim 1, further comprising speed specifying means for specifying said first and second predetermined speeds of said text reading means and said picture reading means, respectively.

4. A picture receiving apparatus according to claim 1, further comprising text display control means for adjusting a number of characters in said video text signal to be displayed on said display means and adjusting the number of display lines on said display means according to said first and second predetermined speeds of said text reading means and said picture reading means, respectively.

5. A picture receiving apparatus according to claim 3, further comprising text display control means for adjusting a number of characters in said video text signal to be displayed on said display means and adjusting a number of display lines on said display means according to said first and second predetermined speeds of said text reading means and said picture reading means, respectively.

6. A picture receiving apparatus according to claim 1, wherein said compressed video data stored in said storage means correspond to one or more programs identified by different respective index information generated by said storage means, further comprising:

index-information display means for displaying said index information of said compressed video data stored in said storage means on said display means; and selection means for selecting one of said programs in accordance with said index information displayed on said display means by said index-information display means, wherein:

said text reading means reads out a portion of said text data corresponding to said program selected by said selection means and said display means displays a portion of said video text signal corresponding to said portion of said text data; and said picture reading means reads out a portion of said compressed video data corresponding to said program selected by said selection means and said display means displays a portion of said video picture signal corresponding to said portion of said compressed video data on said display means.

7. A picture receiving apparatus according to claim 1, further comprising a first child screen on said display means, wherein said display means displays said video picture signal on said first child screen.

8. A picture receiving apparatus according to claim 7, further comprising a second child screen on said display means, wherein said display means displays said video text signal on said second child screen.

9. A text-information displaying method for receiving a signal comprising a video signal and text information corresponding to pictures conveyed in said video signal and for displaying said pictures along with said text information, wherein said text information is superimposed on said video signal, comprising steps of:

extracting text data corresponding to said text information superimposed on said video signal;

converting said video signal into a digital video signal;

compressing said digital video signal into compressed video data;

storing said text data extracted in the step of extracting text data and said compressed video data into recording means;

reading out said text data stored in said recording means at a first predetermined speed and converting said text data into a corresponding video text signal;

reading out said compressed video data stored in said recording means at a second predetermined speed and converting said compressed video data into a corresponding video picture signal; and displaying said video text signal and said video picture signal on display means.

10. A text-information displaying method according to claim 9, wherein, at the step of compressing, said digital video signal is compressed by at least one of thinning out predetermined picture elements of said digital video signal, and by eliminating predetermined frames of said digital video signal.

11. A text-information displaying method according to claim 9, further comprising a step of specifying said first and second predetermined speeds of the steps of reading out said text data and reading out said compressed video data, respectively.

12. A text-information displaying method according to claim 9, further comprising a step of adjusting the number of characters in said video text signal to be displayed on said display means and adjusting the number of display lines on said display means according to said first and second predetermined speeds of the steps of reading out said text data and reading out said compressed video data, respectively.

13. A text-information displaying method according to claim 11, further comprising a step of adjusting the number of characters in said video text signal to be displayed on said display means and adjusting the number of display lines on said display means according to said first and second predetermined speeds of the steps of reading out said text data and reading out said compressed video data, respectively.

14. A text-information displaying method according to claim 9, wherein said compressed video data stored in said recording means correspond to one or more programs identified by different respective index information predetermined and generated by said recording mean, and further comprising steps of:

displaying said index information of said compressed video data stored in said recording means on said display means; and selecting one of said programs in accordance with said index information displayed on said display means at the step of displaying said index information, wherein:

at the step of reading out said text data, only a portion of said text data corresponding to said program selected at the step of selecting one of said programs is read out and converted into a corresponding portion of said video text signal; at the step of displaying said video text signal and said video picture signal, said corresponding portion of said video text signal is displayed on said display means; and at the step of reading out said compressed video data, only a portion of said compressed video data corresponding to said program selected at the step of selecting one of said programs is read out and converted into a corresponding portion of said video picture signal; at the step of displaying said video text signal and said video picture signal, said corresponding portion of said video picture signal is displayed on said display means.

15. A text-information displaying method according to claim 9, wherein said video picture signal is displayed on a given first child screen.

16. A text-information displaying method according to claim 15, wherein said video text signal is displayed on a given second child screen other than said first child screen.

* * * * *